UNITED STATES PATENT OFFICE.

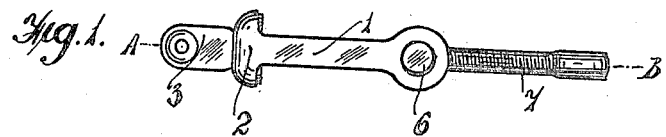
Fig. 1.
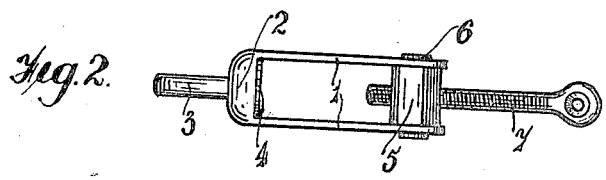
Fig. 2.
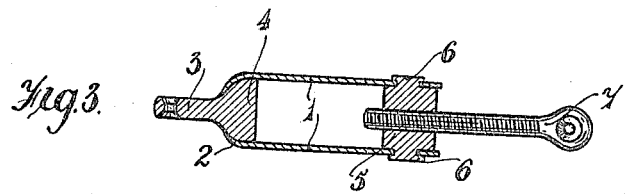
Fig. 3.
Fig. 5. Fig. 6.
Fig. 7.
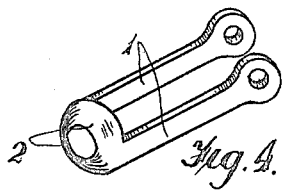
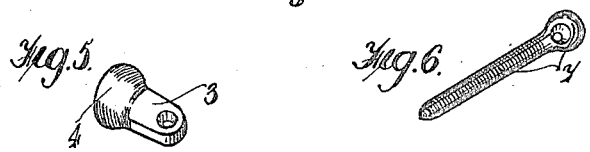
Fig. 4.
Inventor:-
Samuel Rowland Parkes,
By:- B. Singer, Atty.

SAMUEL ROWLAND PARKES, OF WILLENHALL, ENGLAND.

WIRE STRAINER OR TURNBUCKLE.

1,302,425.   Specification of Letters Patent.   Patented Apr. 29, 1919.

Application filed November 4, 1918. Serial No. 261,037.

*To all whom it may concern:*

Be it known that I, SAMUEL ROWLAND PARKES, a subject of the King of Great Britain, residing at Pretoria Works, New Road, Willenhall, in the county of Stafford, England, have invented a new and useful Wire Strainer or Turnbuckle; and I do hereby declare the following to be a full, clear, and exact description of the same.

My invention comprises an improved strainer or turnbuckle particularly intended for use in tensioning wires of aeroplanes though it may be used for any other suitable purpose. More particularly the invention relates to that class of such which comprises a forked or U shaped member having a nut which is engaged by an eyed pin secured to the one wire.

The object of the present invention is to provide an improved device of this kind and in accordance therewith the strainer comprises a main member of forked or U shape in one extremity of which is a swiveled member, while on the other end is a transversely disposed and pivoted nut in combination with an eyed screw pin so arranged that when the main member is swiveled adjustment is effected.

Referring to the drawings:—

Figure 1. is an elevation of a strainer according to this invention.

Fig. 2. is a similar view to Fig. 1 but viewed at right angles thereto.

Fig. 3. is a longitudinal section at A—B in Fig. 1.

Fig. 4. illustrates the forked member removed.

Fig. 5. illustrates the swiveled connecting member.

Fig. 6. illustrates the eyed pin, and

Fig. 7. illustrates the nut.

In carrying this invention into practice as illustrated upon the accompanying drawings the main member 1 is of forked or U shape and is preferably pressed from sheet metal leaving a concave seating 2 within the bend of the U. This seating 2 is provided with a hole which receives a connecting member 3 to which is secured one end of the wire, this connecting member being provided with a semi-spherical part 4 adapted to fit within the recess 2 and forming practically a ball joint therewith.

The opposite extremities of the fork are connected by a nut 5 preferably pivoted to the fork member at 6, 6 so as to be capable of angular movement in relation thereto.

An eyed pin 7 screws into the nut and if the member 1 is swiveled by a suitable tool, the nut swiveling in relation to the eyed pin 7 will effect an adjustment of the strainer.

As will be seen, the strainer is of extremely simple and strong construction and cheap to manufacture.

What I claim then is:—

1. In a wire strainer the combination of a main member of U shape; a connecting member swivelly mounted in the bend of said U shaped member; an internally screwed member pivotally secured and connected to the ends of said U shaped member with its axis at right angles to the length of said member; and an externally screwed member engaging with said internally screwed member, for the purpose specified.

2. In a wire strainer the combination of a member adapted to be secured to one end of the wire to be strained; a main member of U shape and having said attachment member swivelly mounted in the bend of the U; a nut pivotally mounted in and connecting the ends of the U; and an eyed screw adapted to be attached to the second end of the wire to be strained and screwing in to said pivoted nut, for the purpose specified.

In testimony whereof I affix my signature.

SAMUEL ROWLAND PARKES.

Copies of this patent may be obtained for five cents each, by addressing the "Commissioner of Patents, Washington, D. C."